US011167395B2

(12) United States Patent
Merlo et al.

(10) Patent No.: US 11,167,395 B2
(45) Date of Patent: Nov. 9, 2021

(54) CONSTANT FORCE EXPANSION LATTICE

(71) Applicant: Carbon, Inc., Redwood City, CA (US)

(72) Inventors: Austin M. Merlo, Santa Clara, CA (US); Sean Friedrich Walter McCluskey, Redwood City, CA (US)

(73) Assignee: Carbon, Inc., Redwood City, CA (US)

( * ) Notice: Subject to any disclaimer, the term of this patent is extended or adjusted under 35 U.S.C. 154(b) by 789 days.

(21) Appl. No.: 15/938,902

(22) Filed: Mar. 28, 2018

(65) Prior Publication Data

US 2019/0039213 A1    Feb. 7, 2019

Related U.S. Application Data

(60) Provisional application No. 62/512,765, filed on May 31, 2017.

(51) Int. Cl.
| | | |
|---|---|---|
| *B25B 5/16* | (2006.01) | |
| *B33Y 80/00* | (2015.01) | |
| *B29C 64/124* | (2017.01) | |
| *B29C 64/188* | (2017.01) | |
| *B29K 75/00* | (2006.01) | |
| *B33Y 70/00* | (2020.01) | |
| *B29L 31/00* | (2006.01) | |
| *B33Y 10/00* | (2015.01) | |

(52) U.S. Cl.
CPC ............ *B25B 5/163* (2013.01); *B29C 64/124* (2017.08); *B29C 64/188* (2017.08); *B33Y 80/00* (2014.12); *B29K 2075/00* (2013.01); *B29K 2995/0044* (2013.01); *B29K 2995/0096* (2013.01); *B29L 2031/7502* (2013.01); *B33Y 10/00* (2014.12); *B33Y 70/00* (2014.12)

(58) Field of Classification Search
None
See application file for complete search history.

*Primary Examiner* — Jeffrey D Washville
(74) *Attorney, Agent, or Firm* — Myers Bigel, P.A.

(57) ABSTRACT

A constant force expansion construct includes a plurality of expandable layers, each expandable layer including: (a) a longitudinal restricting beam; and (b) a plurality of interconnected flexible biasing struts connecting the longitudinal restricting beam of one expandable layer to another longitudinal restricting beam in a next adjacent expandable layer, the biasing struts being biased toward a compressed position and being movable between the compressed position and an expanded position in which a distance between successive longitudinal restricting beams is increased.

13 Claims, 7 Drawing Sheets

CONSTANT FORCE EXPANSION LATTICE

RELATED APPLICATIONS

This applications claims priority to U.S. Provisional Application Ser. No. 62/512,765, filed May 31, 2017, the disclosure of which is hereby incorporated by reference in its entirety.

FIELD OF THE INVENTION

The present invention concerns expansion materials, and particularly concerns constant force expansion materials.

BACKGROUND

Hooke's law is a principle of physics that states that the force need to compress or extend a body of material by some distance is proportional to that distance. Known since stated by English physicist Robert Hooke in the late 1600s, most materials obey Hooke's law, at least within some limits.

Materials that deviate substantially from Hooke's law, sometimes called "non-Hookean" or "constant force" materials, have a variety of uses. Constant force expansion springs, for example, have diverse uses, including as clock drives, as other mechanical drives, for counterbalancing windows, doors and the like, in biomedical devices, etc. Such springs are, however, made in the form of rolled spools of stainless steel ribbon, limiting their use. Accordingly, there is a need for new forms of constant force expansions devices.

SUMMARY

A first aspect of the present invention is a constant force expansion construct, comprising a plurality of expandable layers, each expandable layer including: (a) a longitudinal restricting beam; and (b) a plurality of interconnected flexible biasing struts connecting the longitudinal restricting beam of one expandable layer to another longitudinal restricting beam in a next adjacent expandable layer, the biasing struts being biased toward a compressed position and being movable between the compressed position and an expanded position in which a distance between successive longitudinal restricting beams is increased.

Expansion constructs as described herein may be produced by: (a) forming an intermediate object by additive manufacturing (preferably by stereolithography, and most preferably by continuous liquid interface production) with a dual cure polymerizable liquid, the intermediate object having the same shape as, or a shape to be imparted to, the construct; then (b) optionally washing the intermediate object; and then (c) further curing the intermediate object, optionally but preferably by heating, to produce the construct.

A further aspect of the invention is a clamping apparatus for engaging an object, comprising: (a) a pair of opposing members, each having an engagement surface; and (b) at least one, or at least a pair of, expansion constructs as described herein operatively connected to the opposing members, with the engagement surfaces of the opposing members facing one another.

The foregoing and other objects and aspects of the present invention are explained in greater detail in the drawings herein and the specification set forth below. The disclosures of all United States patent references cited herein are to be incorporated herein by reference.

DETAILED DESCRIPTION OF ILLUSTRATIVE EMBODIMENTS

Figure 1:
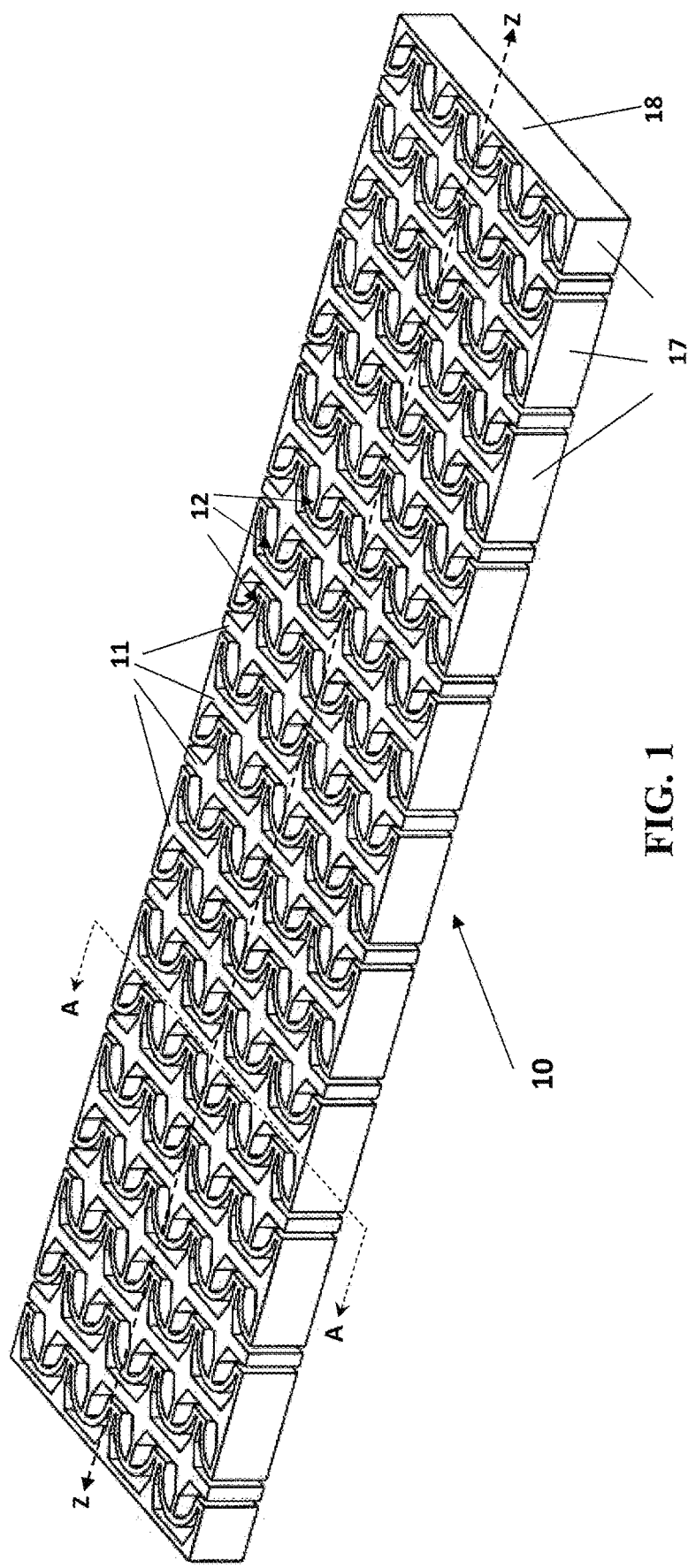
FIG. 1 is a perspective view of an expansion lattice of the present invention.
Figure 2:
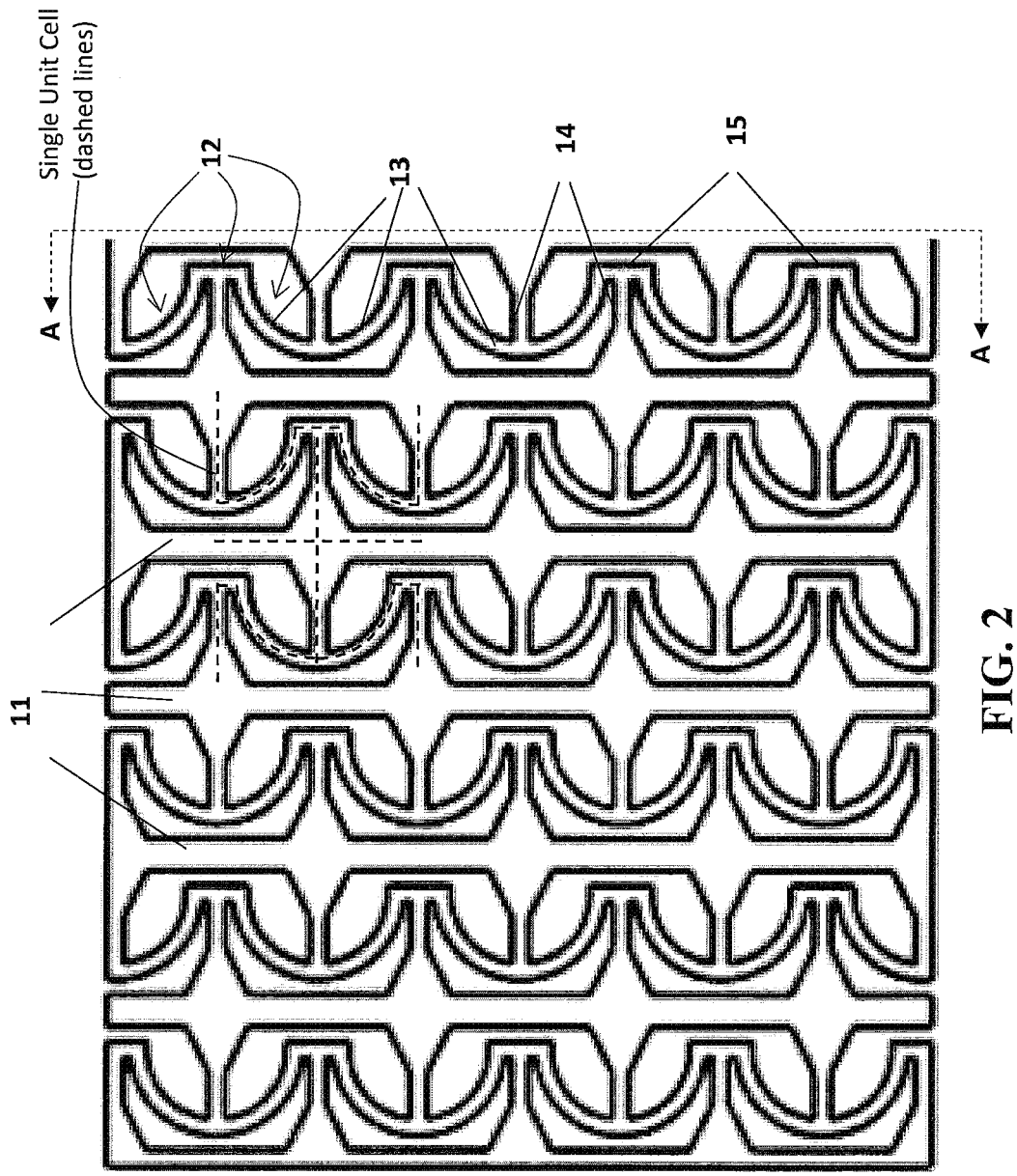
FIG. 2 is a top plan view of a portion of the expansion lattice of FIG. 1, taken from line A-A of FIG. 1.

The present invention is now described more fully hereinafter with reference to the accompanying drawings, in which embodiments of the invention are shown. This invention may, however, be embodied in many different forms and should not be construed as limited to the embodiments set forth herein; rather these embodiments are provided so that this disclosure will be thorough and complete and will fully convey the scope of the invention to those skilled in the art.

As used herein, the term "and/or" includes any and all possible combinations or one or more of the associated listed items, as well as the lack of combinations when interpreted in the alternative ("or").

1. Methods of Making.

Objects or constructs as described herein can be produced by any suitable process, but are preferably produced by additive manufacturing, particularly by stereolithography, and most preferably by continuous liquid interface production (CLIP).

Techniques for additive manufacturing are known. Suitable techniques include bottom-up or top-down additive manufacturing, generally known as stereolithography. Such methods are known and described in, for example, U.S. Pat. No. 5,236,637 to Hull, U.S. Pat. Nos. 5,391,072 and 5,529,473 to Lawton, U.S. Pat. No. 7,438,846 to John, U.S. Pat. No. 7,892,474 to Shkolnik, U.S. Pat. No. 8,110,135 to El-Siblani, U.S. Patent Application Publication Nos. 2013/0292862 to Joyce, and US Patent Application Publication No. 2013/0295212 to Chen et al. The disclosures of these patents and applications are incorporated by reference herein in their entirety.

CLIP is known and described in, for example, U.S. Pat. Nos. 9,211,678; 9,205,601; and 9,216,546; and also in J. Tumbleston, D. Shirvanyants, N. Ermoshkin et al., Continuous liquid interface production of 3D Objects, *Science* 347, 1349-1352 (published online 16 Mar. 2015). See also R. Janusziewcz et al., Layerless fabrication with continuous liquid interface production, *Proc. Natl. Acad. Sci. USA* 113, 11703-11708 (Oct. 18, 2016). In some embodiments, CLIP employs features of a bottom-up three dimensional fabrication as described above, but the irradiating and/or said advancing steps are carried out while also concurrently maintaining a stable or persistent liquid interface between the growing object and the build surface or window, such as by: (i) continuously maintaining a dead zone of polymerizable liquid in contact with said build surface, and (ii) continuously maintaining a gradient of polymerization zone (such as an active surface) between the dead zone and the solid polymer and in contact with each thereof, the gradient of polymerization zone comprising the first component in partially cured form. In some embodiments of CLIP, the optically transparent member comprises a semipermeable member (e.g., a fluoropolymer), and the continuously maintaining a dead zone is carried out by feeding an inhibitor of polymerization through the optically transparent member, thereby creating a gradient of inhibitor in the dead zone and optionally in at least a portion of the gradient of polymerization zone. Other approaches for carrying out CLIP that can be used in the present invention and potentially obviate the need for a semipermeable "window" or window structure include utilizing a liquid interface comprising an immiscible liquid (see L. Robeson et al., WO 2015/164234, published Oct. 29, 2015), generating oxygen as an inhibitor by electrolysis (see I Craven et al., WO 2016/133759, published Aug. 25, 2016), and incorporating magnetically positionable particles to which the photoactivator is coupled into the polymerizable liquid (see J. Rolland, WO 2016/145182, published Sep. 15, 2016).

In one non-limiting embodiment, the object may be produced on a Carbon Inc., M1 additive manufacturing apparatus, available from Carbon, Inc., 1089 Mills Way, Redwood City, Calif. 94063 USA.

After the intermediate three-dimensional object is formed, it is optionally washed, optionally dried (e.g., air dried) and/or rinsed (in any sequence). It is then further cured, preferably by heating.

Heating may be active heating (e.g., in an oven, such as an electric, gas, solar oven or microwave oven, or combination thereof), or passive heating (e.g., at ambient temperature). Active heating will generally be more rapid than passive heating and in some embodiments is preferred, but passive heating—such as simply maintaining the intermediate at ambient temperature for a sufficient time to effect further cure—may in some embodiments also be employed.

2. Materials.

Any suitable material can be used as the polymerizable liquid or resin to carry out the present invention (including expansion lattices, compression lattices, and clamping apparatus comprising the two integrally formed with one another). Preferably, the material is one which produces an elastomeric product. In some embodiments, the objects are comprised of a polyurethane material (including polyurea materials). In some embodiments, the objects are produced from a dual cure stereolithography resin.

Dual cure stereolithography resins suitable for stereolithography techniques (particularly for CLIP) are described in J. Rolland et al., U.S. Pat. Nos. 9,453,142 and 9,598,606 (see also US Patent Application Pub. Nos. US 2016/0136889; 2016/0137838; and 2016/016077). These resins usually include a first polymerizable system typically polymerized by light (sometimes referred to as "Part A") from which an intermediate object is produced, and also include at least a second polymerizable system ("Part B") which is usually cured after the intermediate object is first formed, and which impart desirable structural and/or tensile properties to the final object.

In some embodiments, the polymerizable liquid is a Carbon, Inc. elastic polyurethane (EPU) resin such as EPU40, available from Carbon, Inc., 1089 Mills Way, Redwood City, Calif. 94063 USA.

3. Constant Force Expansion Lattice.

As noted above, and as shown in the non-limiting examples set forth in FIGS. 1-6 herein, a first aspect of the present invention is a constant force expansion construct, comprising a plurality of expandable layers, each expandable layer including: (a) a longitudinal restricting beam 11; and (b) a plurality of interconnected flexible biasing struts 12 connecting the longitudinal restricting beam of one expandable layer to another longitudinal restricting beam in a next adjacent expandable layer, the biasing struts being biased toward a compressed position and being movable between the compressed position and an expanded position in which a distance between successive longitudinal restricting beams is increased.

In some embodiments, each of the plurality of interconnected flexible biasing struts 12 comprises a curvilinear member 13 that is attached to the longitudinal restricting beam 11 by a lateral support member 14.

In some embodiments, the curvilinear member 13 of the flexible biasing struts 12 comprises a semi-circular shape in they compressed position with the lateral support extending from a midpoint of the semi-circular shape to the longitudinal restricting beam.

In some embodiments, the lateral support member comprises a substantially linear lateral support having a thickness that increases in a region adjacent the longitudinal restricting beam.

In some embodiments, the lateral support comprises (that is, may be referred to as) a first lateral support, and each of the plurality of interconnected flexible biasing struts comprises a second lateral support 15 extending from an endpoint of the semi-circular shape to the longitudinal restricting beam.

In some embodiments, the expandable layers each have a unit cell size of 10 or 20 microns (or less) up to 10 or 20 millimeters (or more).

In some embodiments, the plurality of expandable layers together have a height (Z dimension) of 10 or 20 unit cells (or less), up to $10^6$ or $10^{12}$ unit cells (or more).

In some embodiments, the plurality of interconnected flexible biasing struts form an expandable region that has an expandable ratio (of pre-expanded distance to expanded distance) of at least 1:2 or 1:3, to 1:8 or 1:10, or more.

In some embodiments, the struts and beams are integrally formed with one another.

In some embodiments, the struts and beams are comprised of an elastomeric material.

In some embodiments, the struts and beams are comprised of polyurethane.

Figure 3A:
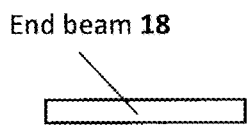
FIG. 3A is an end view of the lattice of FIGS. 1-2.
Figure 3B:
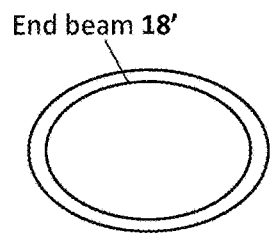
FIG. 3B is an end view of an alternate embodiment of the invention, in which the longitudinal restricting beams are continuous and elliptical in shape.
Figure 3C:
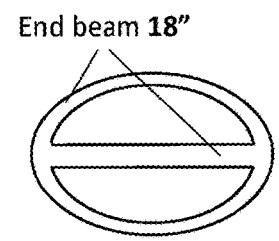
FIG. 3C is an end view of another alternate embodiment of the invention, which is a composite of the embodiments of FIGS. 3A-3B.

In some embodiments, the expandable layers are flat (as shown by the end beam 18 in FIG. 3A), curved (as shown by the end beam 18' in FIG. 3B) or a combination thereof (such as shown by the end beam 18" in FIG. 3C). Indeed, the expandable layers may be continuous or connected edge-to-edge to form a cylinder, as shown in FIG. 3B. An elliptical cylinder is indicated by FIG. 3B, but the cylindrical embodiments of the construct may have any suitable cross-sectional shape, such as round, hexagonal, rectangular, triangular, etc., including composites thereof (for example, as shown in FIG. 3C).

Figure 4:
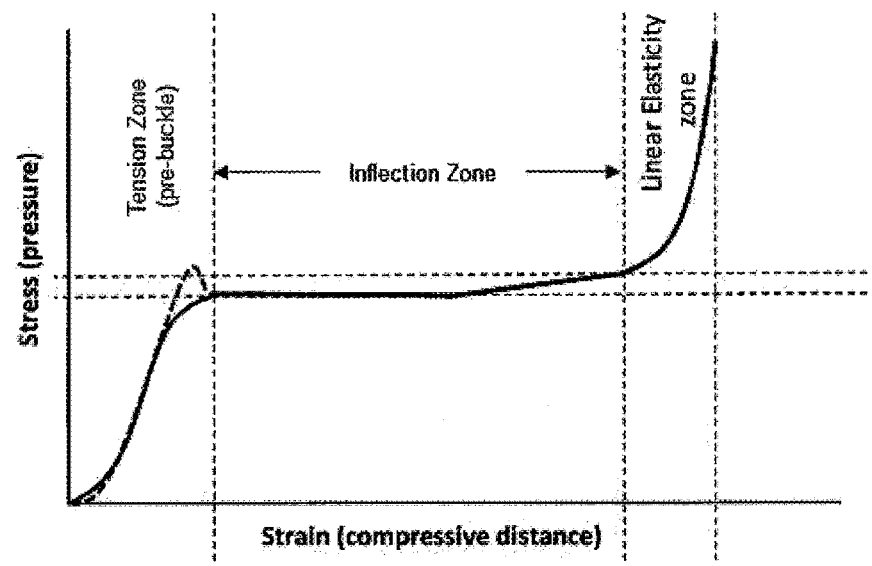
FIG. 4 is a schematic stress-strain curve of an expansion lattice of the present invention.
Figure 5:
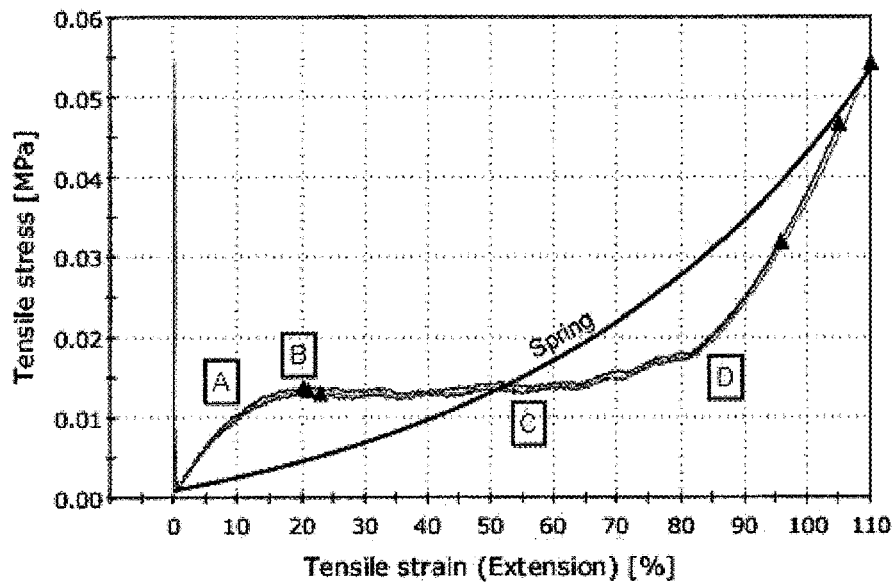
FIG. 5 is a set of actual stress-strain curves of an expansion lattice of the present invention.
Figure 6A:
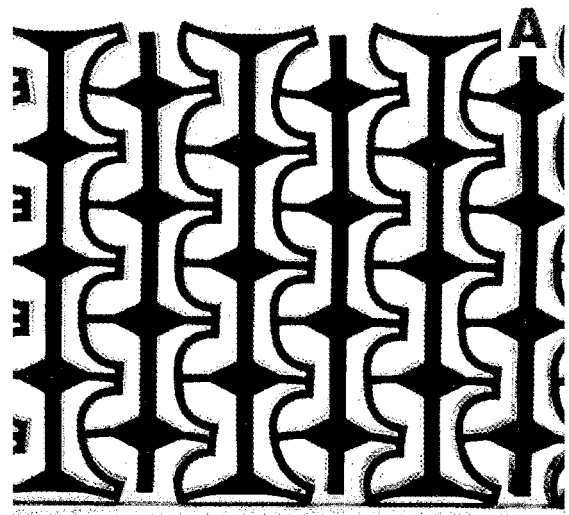
FIG. 6A is a photograph of the expansion lattice used to generate FIG. 4, taken at point A in FIG. 5.
Figure 6B:
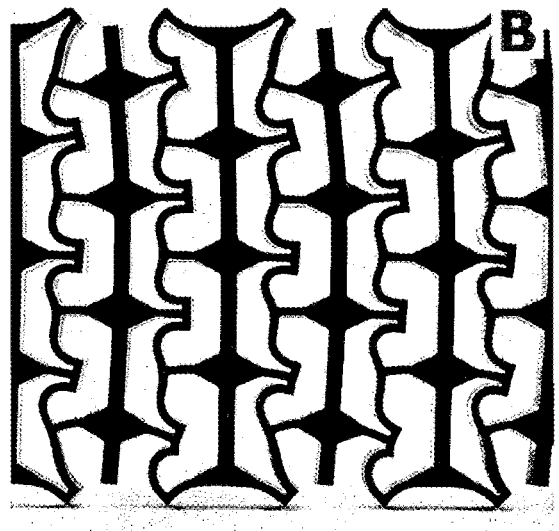
FIG. 6B is a photograph of the expansion lattice used to generate FIG. 4, taken at point B in FIG. 5.
Figure 6C:
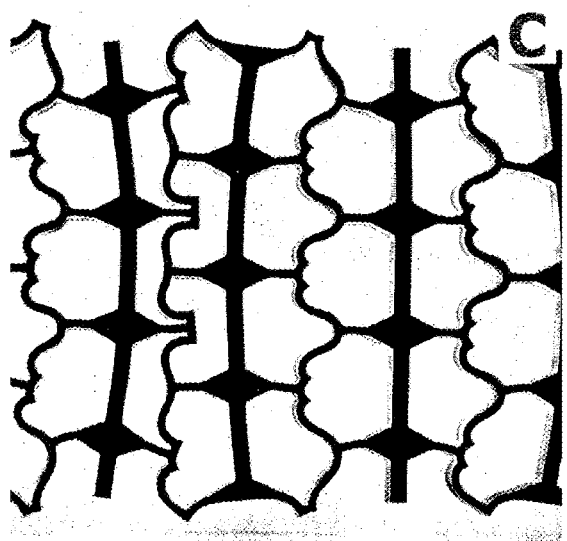
FIG. 6C is a photograph of the expansion lattice used to generate FIG. 4, taken at point C in FIG. 5.
Figure 6D:
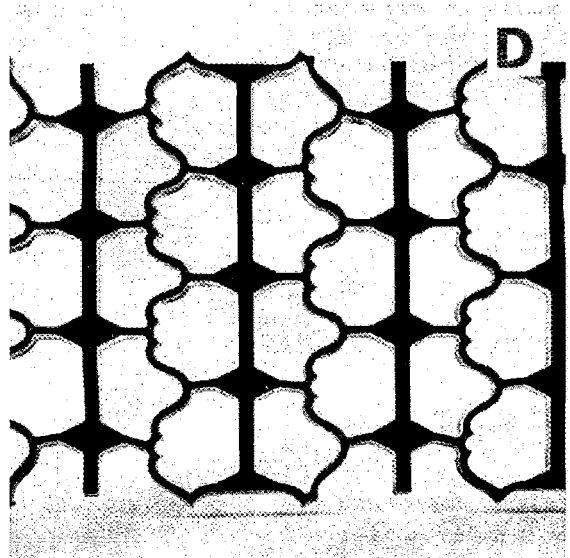
FIG. 6D is a photograph of the expansion lattice used to generate FIG. 4, taken at point D in FIG. 5.

FIG. 4 shows a schematic example of a stress-strain curve of an expansion construct of the invention, with the region of relatively constant force indicated by the inflection zone. A slight inflection may occur during the pre-buckling phase, as indicated by the dashed line of otherwise overlapping curves, and some drift may occur during the inflection zone, while behavior still remains substantially non-Hookean until the later, linear elasticity, zone is reached. FIG. 5 shows stress strain curves for an actual lattice of the invention (see photographs in FIG. 6A-6D, corresponding to the configuration of the lattice at points A, B, C, and D in FIG. 5), indicating behavior substantially the same as shown in FIG. 4. The behavior of a "Hookean" spring is shown by the curve.

4. Clamping Apparatus Comprised of a Constant Force Expansion Lattice, and Optionally at Least One Compression Lattice.

As noted above and schematically illustrated in FIGS. 7A-7B, a further aspect of the invention is a clamping apparatus for engaging an object, comprising: (a) a pair of opposing members, each having an engagement surface; and (b) at least one, or at least a pair of, expansion constructs 10 as described above operatively connected to the opposing members, with the engagement surfaces facing one another.

In some embodiments, at least one of the opposing members comprises a Hookean or non-Hookean compression construct. In some more particularly embodiments, at least one, or both, of the compression constructs comprises a constant force compression construct.

Figure 7B:
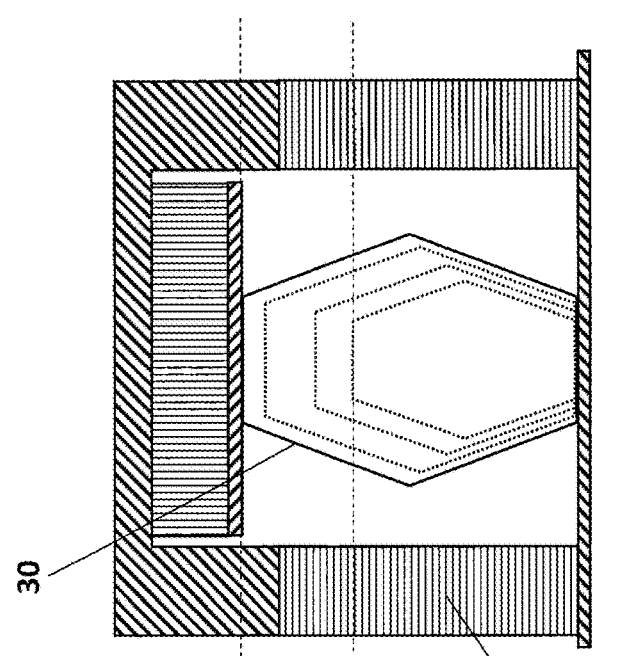
FIG. 7B is a schematic diagram of the clamping apparatus of FIG. 7A, with the expansion lattice in an expanded configuration and the compression lattice in a compressed configuration.
Figure 7A:
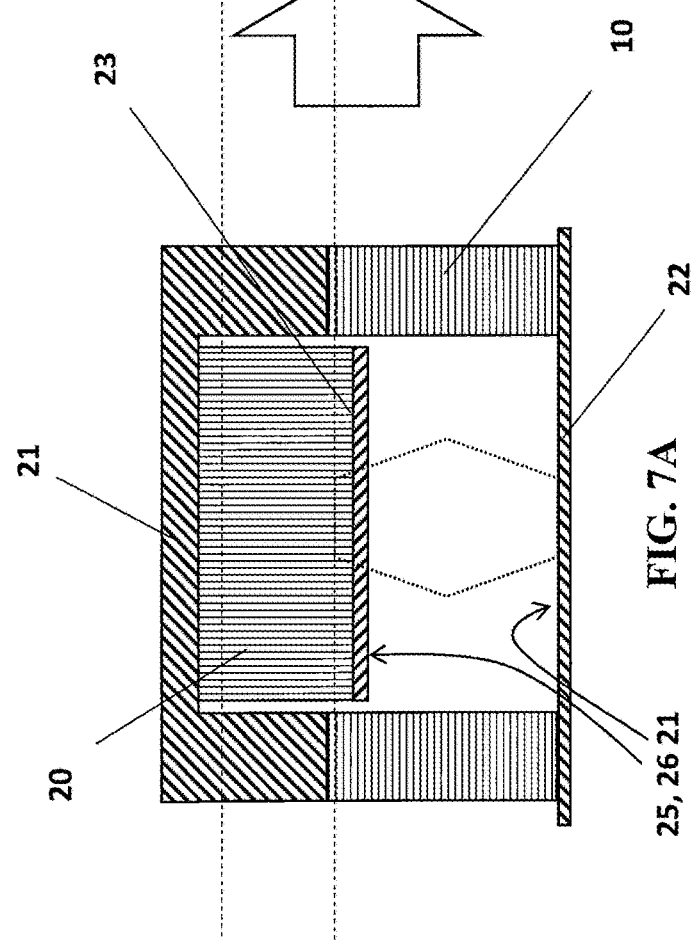
FIG. 7A is a schematic diagram of a clamping apparatus incorporating an expansion lattice of the invention, as well as a compression lattice, in a relaxed configuration.
Figure 8:
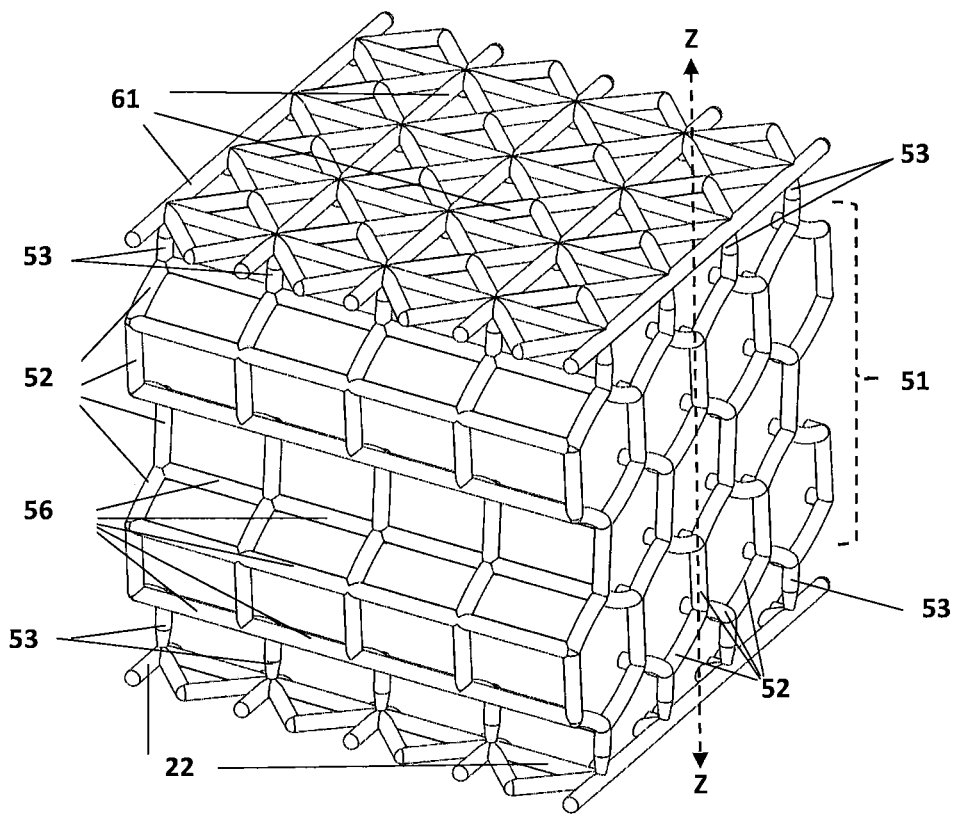
FIG. 8 is a perspective view of a constant force compression lattice useful in carrying out the apparatus of FIGS. 7A-7B, with internal portions of the object omitted for clarity.
Figure 9:
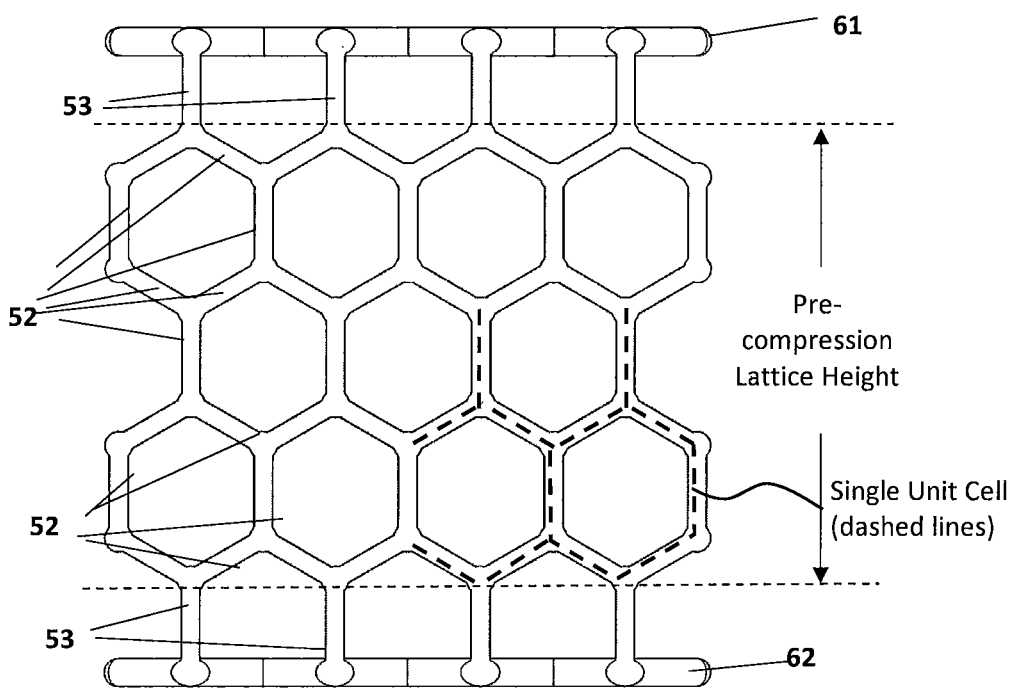
FIG. 9 is a first side view of the lattice of FIG. 8.
Figure 10:
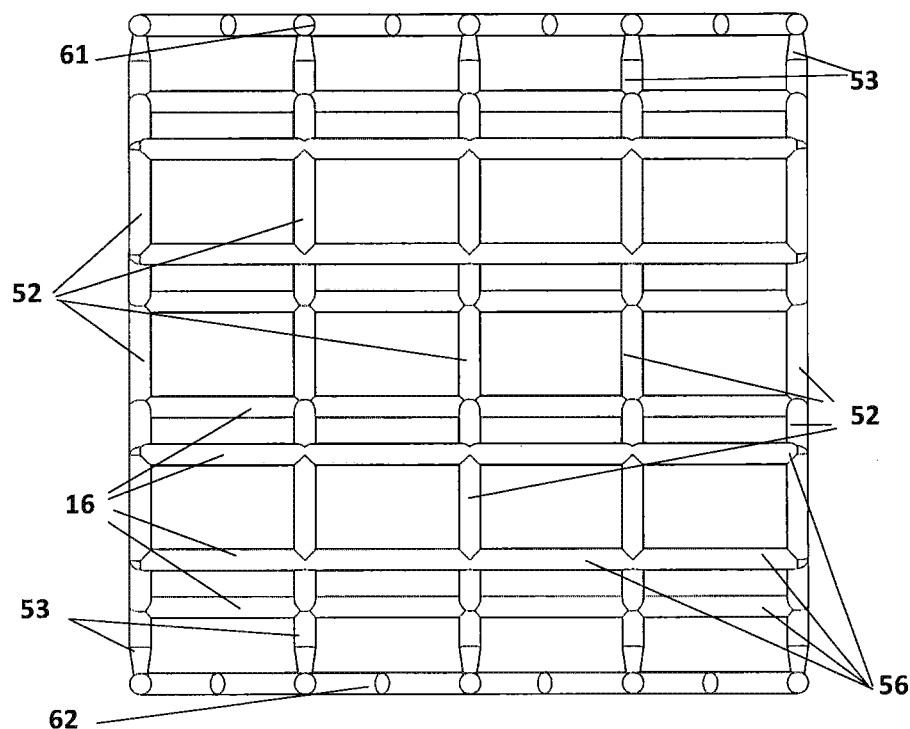
FIG. 10 is a second side view of the lattice of FIG. 8.
Figure 11:
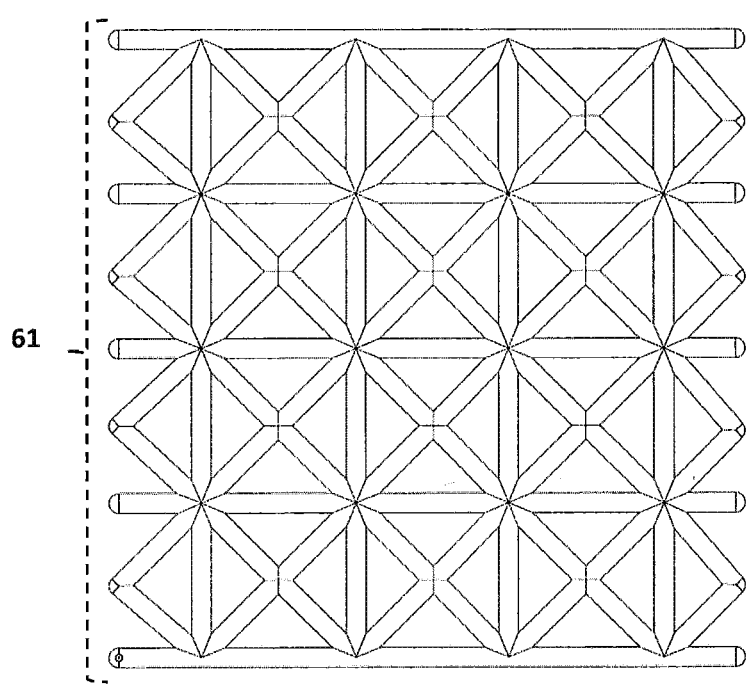
FIG. 11 is a top view of the lattice of FIG. 8.

In the embodiment of FIGS. 7A-7B, one of the opposing members is simply a flat, preferably rigid, member 22, while the other opposing member includes a compression lattice 20 connected to the expansion lattice 10 through an interconnecting member 21. A Transition member 23 is included on the compression lattice, with engagement surfaces 25, 26, facing each other. Thus a plurality of objects 30 of different sizes (represented by dashed lines) may be engaged, all across distance d, with substantially uniform force. While the compression lattice 20 (or other compression construct, such as an elastomeric foam) may be a conventional or "Hookean" compression material, in some embodiments (where particularly uniform clamping force may be desired, all with some cushioning effect, across a range of objects of different sizes), the compression material may itself be a constant force compression object, an example of which is discussed further below.

Note that while the engagement surfaces are shown flat in FIGS. 7A-7B, engagement surfaces of any suitable shape may be used, depending on the object to be clamped or engaged thereby. The object to be clamped may be an inanimate object or conventional "workpiece," such as one to be repetitively engaged by a robotic device, or the object may be a limb, appendage, or body part of a human or animal subject. The clamping apparatus may itself be securely fastened to a work station or other relatively immobile object (e.g., directly, or via an intermediate adjustable component such as a robotic arm), or may be "free" and carry some other additional component to be temporarily clamped to the object (e.g., an electronic or electromechanical device, such as a transducer, detector, etc.)

While the apparatus may be made by any suitable technique, including as component parts assembled together, in some embodiments the entire clamping apparatus, including the expansion construct and the opposing members (optionally wherein at least one or both further comprise a compression construct) are all produced by the process of additive manufacturing, optionally but in some embodiments preferably simultaneously, from the same polymerizable resin, so that all components are integrally connected to one another. Components such as engagement surfaces, transition members, and interconnecting members may be of the same material and simply formed in a configuration, such as a lattice structure, that is substantially rigid as compared to the expansion lattice (and compression lattice is present), or the materials may be switched in the course of additive manufacture (as is known in the art).

5. Constant Force Compression Lattice.

As noted above, disclosed herein is a constant force compression construct. The construct includes (a) a plurality of compressible layers (e.g., compressible in an edge-wise direction), each compressible layer comprising a plurality of interconnected flexible struts configured as a regular hexagonal lattice of repeating unit cells, with the layers spaced apart from one another, and with the unit cells of each layer aligned with one another; and (b) a plurality of beams interconnecting each of the compressible layers with each respective adjacent compressible layer to form a three-dimensional lattice having an upper portion, a lower portion, and a compressible region therebetween, with the repeating unit cells contained in the compressible region. Optionally, but in some embodiments preferably, the construct further includes (c) a first force-dispersing segment (or "pad") connected to the upper portion. Optionally, but in some embodiments preferably, the construct further includes (d) a second force-dispersing segment (or "pad') connected to the lower portion. An example of one embodiment is shown in FIGS. 8-11.

In some embodiments of the foregoing, the compressible region (or "compressible lattice") is anisotropically compressible in plane with the compressible layers and along the longest dimension of the hexagonal structures upon substantially constant (e.g., plus or minus five or ten percent) application of pressure (within the "plateau zone", which does not including linear elasticity zones or densification zones typical in compressive stress-strain curves), and which compressible region rebounds to its prior pre-compressed dimension upon removal of the pressure (assuming not compressed to failure, in terminal regions of the densification zone).

In some embodiments, the compressible layers are flat (as shown in FIGS. 8-11), curved, or a combination thereof.

In some embodiments, the beams are parallel to one another (as shown in FIG. 8-11), radially arranged with respect to one another, or a combination thereof.

In some embodiments of the foregoing, the compressible region (or "compressible lattice") has a compression ratio (of precompressed height to compressed height) of at least 2:1 or 3:1, to 8:1 or 10:1, or more.

In some embodiments of the foregoing, the compressible layers have a unit cell size of 10 or 20 microns (or less) up to 10 or 20 millimeters (or more). In some embodiments of the foregoing, the compressible layers have a height (that is, in the Z dimension) of 10 or 20 unit cells (or less), up to $10^6$ or $10^{12}$ unit cells (or more).

In some embodiments, the struts and beams (and optionally, but preferably, the first and/or second force-dispersing elements) are integrally formed with one another.

In some embodiments, the struts and beams (and optionally, but preferably, the first and/or second force-dispersing elements) are comprised of an elastomeric material.

In some embodiments, the struts and beams (and optionally, but in some embodiments preferably, the first and/or second force-dispersing elements) are comprised of polyurethane.

The foregoing is illustrative of the present invention, and is not to be construed as limiting thereof. The invention is defined by the following claims, with equivalents of the claims to be included therein.

We claim:

1. A constant force expansion construct, comprising a plurality of expandable layers, each expandable layer comprising:
   (a) a longitudinal restricting beam; and
   (b) a plurality of interconnected flexible biasing struts connecting the longitudinal restricting beam of one expandable layer to another longitudinal restricting beam in a next adjacent expandable layer, the biasing struts being biased toward a compressed position and being movable between the compressed position and an expanded position in which a distance between successive longitudinal restricting beams is increased.

2. The expansion construct of claim 1, wherein each of the plurality of interconnected flexible biasing struts comprises a curvilinear member that is attached to the longitudinal restricting beam by a lateral support member.

3. The expansion construct of claim 2, wherein the curvilinear member of the flexible biasing struts comprises a semi-circular shape in the compressed position with the lateral support extending from a midpoint of the semi-circular shape to the longitudinal restricting beam.

4. The expansion construct of claim 3, wherein the lateral support member comprises a substantially linear lateral support having a thickness that increases in a region adjacent the longitudinal restricting beam.

5. The expansion construct of claim 2, wherein the lateral support comprises a first lateral support, and each of the plurality of interconnected flexible biasing struts comprises a second lateral support extending from an endpoint of the semi-circular shape to the longitudinal restricting beam.

6. The apparatus of claim 1, wherein said expandable layers each have a unit cell size of 10 to 20 millimeters.

7. The apparatus of claim 1, wherein said plurality of expandable layers together have a height (Z dimension) of 10 unit cells (or less) to $10^{12}$ unit cells.

8. The expansion construct of claim 1, wherein the plurality of interconnected flexible biasing struts form an expandable region that has an expandable ratio (of pre-expanded distance to expanded distance) of at least 1:2 to 1:10.

9. The expansion construct of claim 1, wherein said struts and beams are integrally formed with one another.

10. The expansion construct of claim 1, wherein said struts and beams are comprised of an elastomeric material.

11. The expansion construct of claim 1, wherein said struts and beams are comprised of polyurethane.

12. The expansion construct of claim 1, wherein said expandable layers are flat, curved or a combination thereof, including cylindrical and composite constructs thereof.

13. The expansion construct of claim 1, wherein said construct is produced by the process of additive manufacturing.

* * * * *